United States Patent [19]
Niemi et al.

[11] Patent Number: 5,685,467
[45] Date of Patent: Nov. 11, 1997

[54] CARGO BED UTILITY BOX

[75] Inventors: Karl Niemi, Waunakee; Patrick Quigley, Portage, both of Wis.

[73] Assignee: Penda Corporation, Portage, Wis.

[21] Appl. No.: 547,892

[22] Filed: Oct. 25, 1995

[51] Int. Cl.$^6$ .................................................. B60R 9/00
[52] U.S. Cl. .................. 224/404; 224/542; 220/23.83; 220/528; 220/608; 220/633
[58] Field of Search .................. 224/404, 403, 224/405, 541, 542, 540; 296/37.6; 220/606, 608, 633, 528, 23.83, 23.86

[56] References Cited

U.S. PATENT DOCUMENTS

| | | | |
|---|---|---|---|
| D. 274,139 | 6/1984 | Suffern et al. | D12/157 |
| D. 275,275 | 8/1984 | Stapp | D12/157 |
| D. 294,816 | 3/1988 | Hoyt | D12/157 |
| D. 300,019 | 2/1989 | Dickinson | D12/157 |
| D. 303,780 | 10/1989 | Sauber | D12/157 |
| D. 305,315 | 1/1990 | Fletcher | D12/157 |
| D. 324,197 | 2/1992 | Dickinson | D12/157 |
| D. 349,091 | 7/1994 | Dickinson | D12/406 |
| 3,727,971 | 4/1973 | Sisler | 224/404 |
| 3,940,009 | 2/1976 | Szeles | 220/20 |
| 4,085,961 | 4/1978 | Brown | 296/37.6 |
| 4,179,153 | 12/1979 | Cole, Jr. | 296/37.1 |
| 4,249,295 | 2/1981 | Lance | 29/416 |
| 4,288,011 | 9/1981 | Grossman | 224/404 |
| 4,469,364 | 9/1984 | Rafi-Zadeh | 296/37.6 |
| 4,488,669 | 12/1984 | Waters | 224/404 |
| 4,531,774 | 7/1985 | Whatley | 296/37.6 |
| 4,543,798 | 10/1985 | Page | 62/239 |
| 4,580,827 | 4/1986 | Feagan | 296/37.6 |
| 4,635,992 | 1/1987 | Hamilton et al. | 296/37.6 |
| 4,674,665 | 6/1987 | Van Kirk | 224/273 |
| 4,705,317 | 11/1987 | Henri | 296/37.6 |
| 4,728,017 | 3/1988 | Mullican | 224/404 |
| 4,741,441 | 5/1988 | Keffeler | 220/528 |
| 4,770,335 | 9/1988 | Wingert | 227/139 |
| 4,789,195 | 12/1988 | Fletcher | 296/37.6 |
| 4,844,305 | 7/1989 | McKneely | 224/42.42 |
| 4,848,626 | 7/1989 | Waters | 224/404 |
| 4,850,519 | 7/1989 | Farmer, Jr. | 224/42.42 |
| 4,944,544 | 7/1990 | Dick | 296/37.1 |
| 4,946,215 | 8/1990 | Taylor | 296/37.6 |
| 4,967,944 | 11/1990 | Waters | 224/273 |
| 4,998,425 | 3/1991 | Hoogland | 70/159 |
| 5,052,737 | 10/1991 | Farmer, Jr. | 224/404 |
| 5,080,250 | 1/1992 | Dickinson et al. | 220/335 |
| 5,094,375 | 3/1992 | Wright | 224/42.42 |
| 5,121,306 | 6/1992 | Palmisano | 362/80 |
| 5,183,307 | 2/1993 | Chiu, Jr. | 296/24.1 |
| 5,188,414 | 2/1993 | Burnham et al. | 296/37.6 |
| 5,235,830 | 8/1993 | Benge | 70/56 |
| 5,303,969 | 4/1994 | Simnacher | 296/37.6 |
| 5,441,707 | 8/1995 | Lewis et al. | 220/23.86 |
| 5,484,092 | 1/1996 | Cheney | 224/404 |

FOREIGN PATENT DOCUMENTS

| 2030143 | 5/1992 | Canada | 224/404 |
|---|---|---|---|

*Primary Examiner*—Linda J. Sholl
*Attorney, Agent, or Firm*—Lathrop & Clark

[57] ABSTRACT

The invention provides a tool or utility box for use in the cargo bed of a pick-up truck. The utility box includes spaced apart legs that provide a space beneath the box to accommodate sheet material and that are hollow to provide drainage compartments to collect water so that it can be effectively drained from the utility box. The utility box also includes ribbed walls that provide slots for receiving dividers, and trays can be supported inside or outside of the utility box and secured against movement by detents.

8 Claims, 7 Drawing Sheets

CARGO BED UTILITY BOX

BACKGROUND OF THE INVENTION

1. Field of the Invention

The invention relates generally to storage containers or boxes, and more particularly to utility or tool boxes useable in the cargo bed of a pick-up truck.

2. Reference to Prior Art

Tool or utility boxes designed for use in the cargo beds of pick-up trucks to store tools or other equipment come in a variety of shapes and sizes. Those utility boxes typically include a bin portion having a lockable lid. Examples of utility boxes and other storage accessories for pick-up truck cargo beds are provided in the following U.S. Pat. Nos.

| | | |
|---|---|---|
| 5,303,969 | 4,848,626 | 4,288,011 |
| 5,235,830 | 4,844,305 | 4,249,295 |
| 5,188,414 | 4,789,195 | 4,179,153 |
| 5,183,307 | 4,728,017 | 4,085,961 |
| 5,121,306 | 4,705,317 | 3,940,009 |
| 5,094,375 | 4,635,992 | Des. 349,091 |
| 5,080,250 | 4,674,665 | Des. 324,197 |
| 4,998,425 | 4,580,827 | Des. 303,780 |
| 4,967,944 | 4,543,798 | Des. 305,315 |
| 4,946,215 | 4,531,774 | Des. 300,019 |
| 4,944,544 | 4,488,669 | Des. 294,816 |
| 4,850,519 | 4,469,364 | Des. 275,275 |
| | | Des. 274,139 |

It is known to provide utility boxes or other storage accessories with separate drawers, dividers or trays to compartmentalize a storage area. For example, U.S. Pat. No. 4,288,011 illustrates a pick-up truck tool box including a tray having a flange at its periphery for supporting the tray for sliding movement on a support surface, and U.S. Pat. No. 4,967,944 illustrates a utility box including ribs that have upper surfaces which act as a support surface for a tray. Also, U.S. Pat. Nos. 5,094,375 and 4,848,626 illustrate utility boxes that incorporate dividers. In particular, U.S. Pat. No. 4,848,626 illustrates a utility box 10 having vertical walls provided with ribs and dividers having tab elements for receiving therebetween one of the ribs to hold the divider in place.

It is further known to provide pick-up truck storage boxes with features that inhibit entry of water into the storage compartments or that improve drainage of water from those compartments. For example, it is known to provide seals around the door openings of those boxes, such as is shown in U.S. Pat. No. 4,967,944. That patent illustrates a utility box including a seal surface extending around the periphery of an opening in the box and a lid having a flexible rubber seal that engages the seal surface when the lid is closed. Other seal arrangements are provided in U.S. Pat. Nos. 4,488,669 and 5,080,250. It is also known to provide drain holes in the bottoms of truck tool boxes as is shown in U.S. Pat. Nos. 4,770,330 and 4,728,017.

Utility boxes and other storage accessories are also provided with various mechanisms for supporting themselves within a pick-up cargo bed. For example, truck tool or utility boxes can be supported on the bed side walls of a truck so that it is positioned above the floor of the cargo bed (as shown in U.S. Pat. Nos. 4,998,425 and 4,944,544). Tool or utility boxes can also be supported on legs to provide a space beneath the tool box (as shown in U.S. Pat. Nos. 4,288,011, Des. 294,816 and Des. 300,019). To secure the tool or utility box against shifting, it is also known to fasten the box to the truck bed using intrusive means such as bolts or anchors that extend through the truck bed walls. Examples of those constructions are provided in U.S. Pat. Nos. 4,936,624, 4,543,798 and 4,531,774. Non-intrusive clamp members have also been employed to secure a tool or utility box against shifting, as shown in U.S. Pat. No. 4,728,017.

SUMMARY OF THE INVENTION

The invention provides a tool or utility box that is designed for use in the cargo bed of a pick-up truck and that has improved storage capabilities, better leak prevention and drainage characteristics, and an improved support arrangement relative to prior art truck tool or utility boxes. The improved utility box of the present invention is made of thermoformed plastic material and has an aesthetically pleasing aerodynamic appearance. In particular, the improved box includes contoured surfaces that, in addition to providing an attractive appearance, camouflage any warpage which may occur in the plastic material.

In particular, the utility box has improved features that enhance the storage capabilities of the box. In one embodiment, the utility box includes a bin having front and back walls that are provided with ribs defining slots. Dividers are insertable into the slots to compartmentalize the bin. The utility box can also be provided with a tray which can be supported inside or outside of the bin. When supported within the bin the tray can be placed on a support rim that is formed by a ledge on the back wall and the top parts of the ribs on the front wall. To keep the tray from sliding along the support rim, the tray includes a detent that can be fitted between a pair of the ribs (i.e., in one of the slots). The tray can also be placed outside the bin in a space defined between the bottom wall of the bin and the floor of a pick-up truck cargo bed. To keep the tray from sliding along the cargo bed floor additional cooperating detents are provided on the bottom wall of the bin.

The utility box also incorporates improved leak resistance and drainage features. One of those features includes the provision of legs on the bin to support the bottom wall of the box above the cargo bed floor. The bottom wall is arch-shaped so that any fluids accumulating thereon drain into one of a pair of drainage compartments defined by the legs. The legs are also provided with drain holes to evacuate that fluid and plug members for the drain holes.

The utility box also incorporates an improved support arrangement for supporting itself within the cargo bed. For example, in one embodiment the legs support the utility box independent of the cargo bed side walls and are spaced apart at least about 48 inches so that four foot sheet material can be slid beneath the utility box and to the front of the cargo bed. The utility box is also provided with an arrangement for clamping the box to the cargo bed without the need to drill holes in the cargo bed.

More particularly, the invention provides a storage container for use in the cargo bed of a pickup truck, the storage container including a bin defining a storage compartment. The bin includes an annular upper rim defining an opening into the storage compartment, and the bin includes a bottom wall, a front wall having a plurality of ribs that define vertical slots and that include upper surfaces, and a back wall. The back wall also includes a plurality of ribs defining vertical slots and a ledge that is spaced above the ribs on the back wall and that includes a support surface. The support surface and the upper surfaces of the ribs on the front wall combine to form a generally horizontal support rim spaced below the upper rim. The storage container also includes a tray that is supportable on the support rim.

The invention also provides a storage container including a bin that includes a bottom wall and legs extending downwardly from the bottom wall for supporting the bin on the floor of the cargo bed of a pick-up truck with the bottom wall spaced above the floor of the cargo bed. The storage container also includes means for preventing lateral movement of the bin relative to the cargo bed, that means including a clamp member that is engageable with the cargo bed and that includes means confined within the storage compartment for adjusting the clamp member.

The invention further provides a storage container including a bin that includes an upper rim having an annular seal surface and a stepped portion extending downwardly from the seal surface, a support rim spaced below the upper rim, and a back wall having a slanted surface portion extending from the support rim and a projection extending upwardly from the slanted surface portion. The storage container also includes a gasket extending along the periphery of the sealing surface and a lid pivotally mounted on the projection for movement between opened and closed positions. The lid includes a sealing surface and a peripheral lip extending outwardly from the sealing surface. When the lid is closed the sealing surface on the lid overlies the sealing surface on the rim of the bin and the peripheral lip overlies the stepped portion.

The invention still further provides a utility box including a bin that includes a bottom wall and legs extending downwardly from the bottom wall for supporting the bin in a cargo bed with the bottom wall spaced above the floor of the cargo bed. Each of the legs defines a drainage compartment extending below the bottom wall for receiving any fluid that accumulates in the storage compartment. The utility box also includes a lid pivotally mounted on the bin to open and close the bin.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Figure 7:
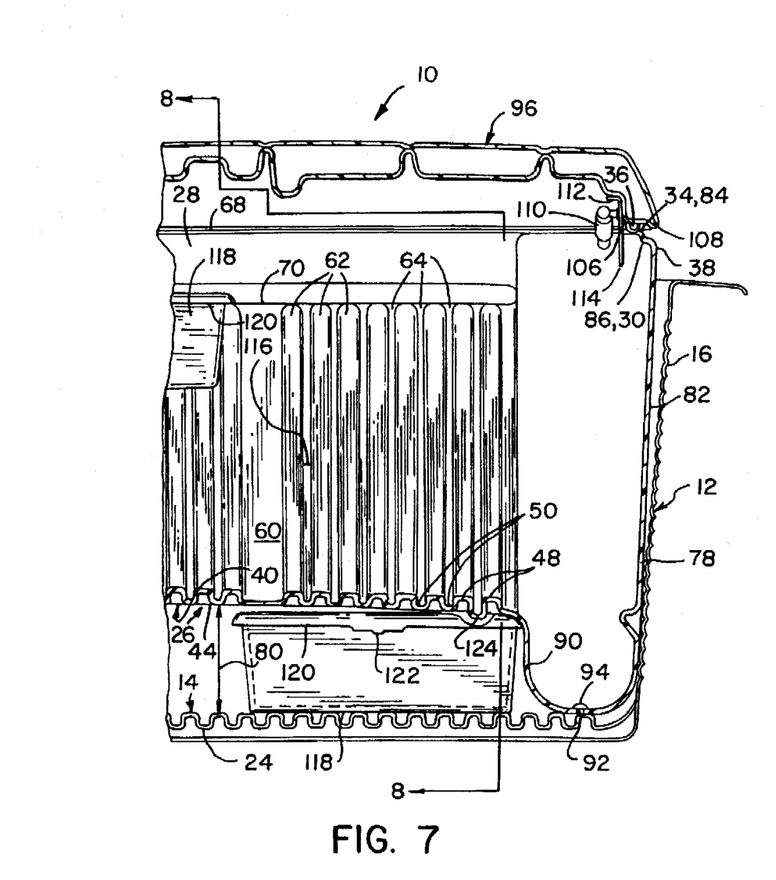
FIG. 7 is an enlarged partially cut away and cross-sectional view of a portion of the utility box shown with the front wall of the box removed (i.e., taken generally along line 7—7 in FIG. 4), the utility box being shown positioned in the cargo bed of a pick-up truck and with a pair or ancillary trays.
Figure 8:
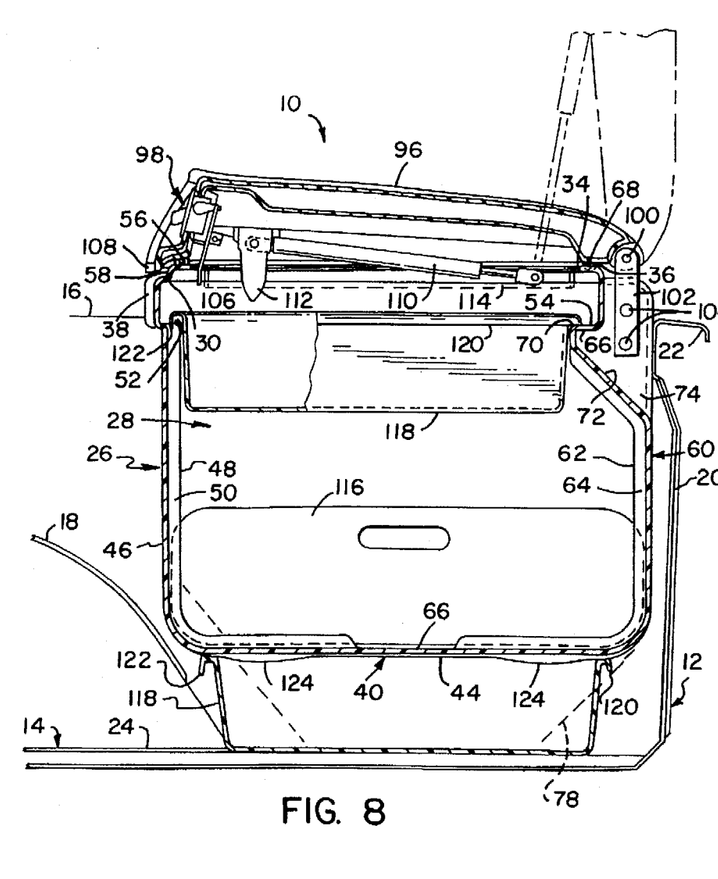
FIG. 8 is a partially cut-away, partially cross-sectional view taken generally along line 8—8 in FIG. 7.

Illustrated in FIGS. 1–5 is a storage container which in the arrangement shown in the drawings is designed for use as a tool or utility box 10. As is explained below, the utility box 10 can be mounted in the cargo bed 12 of a pick-up truck. In the illustrated arrangement the cargo bed 12 is standard and its construction is known to those skilled in the art. Briefly, as shown in FIGS. 7 and 8 the cargo bed 12 includes a bottom wall or floor 14, opposite side walls 16 (only one of which is shown) that include wheel well portions 18, and a front wall 20 that is provided with (FIG. 10) a generally J-shaped rail portion 22. Preferably, the cargo bed 12 is provided with a bed liner 24 such as is shown in one of U.S. Pat. Nos. 5,221,119, 4,575,146 or 4,592,583, for example. All of those patents are assigned to the assignee of the present invention, Penda Corporation, Portage, Wis.

Figure 1:
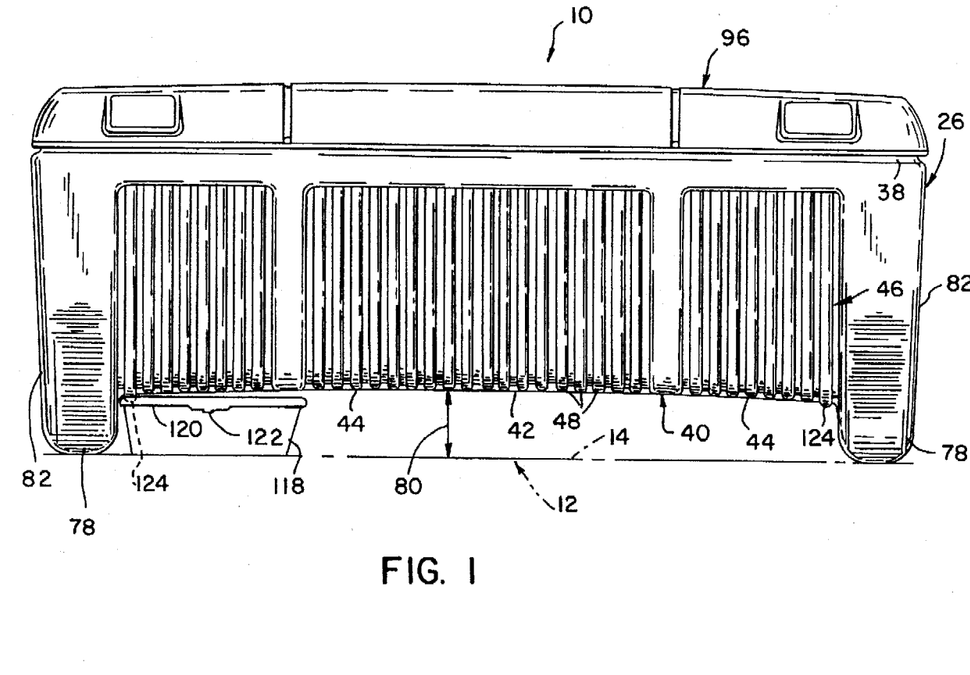
FIG. 1 is front view of a utility box embodying features of the invention and shown with an ancillary a tray positioned beneath the box.
Figure 2:
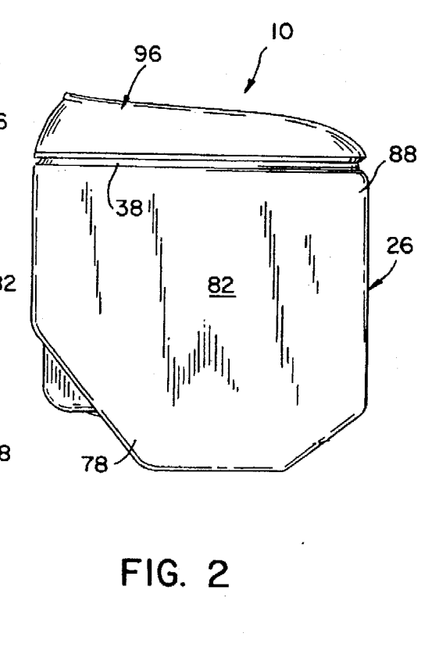
FIG. 2 is a side view of the utility box shown in FIG. 1.
Figure 3:
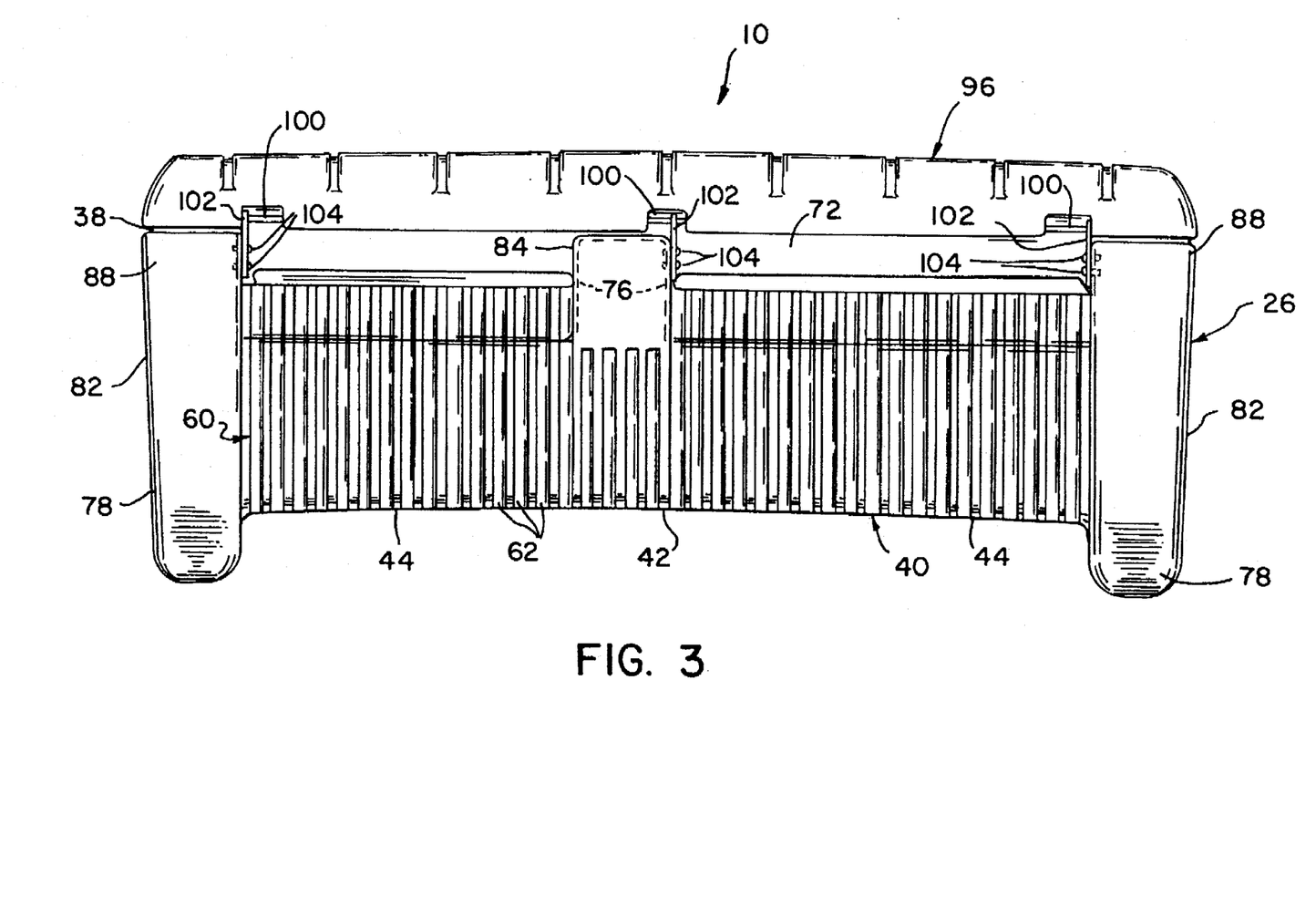
FIG. 3 is a rear view of the utility box shown in FIG. 1.
Figure 4:
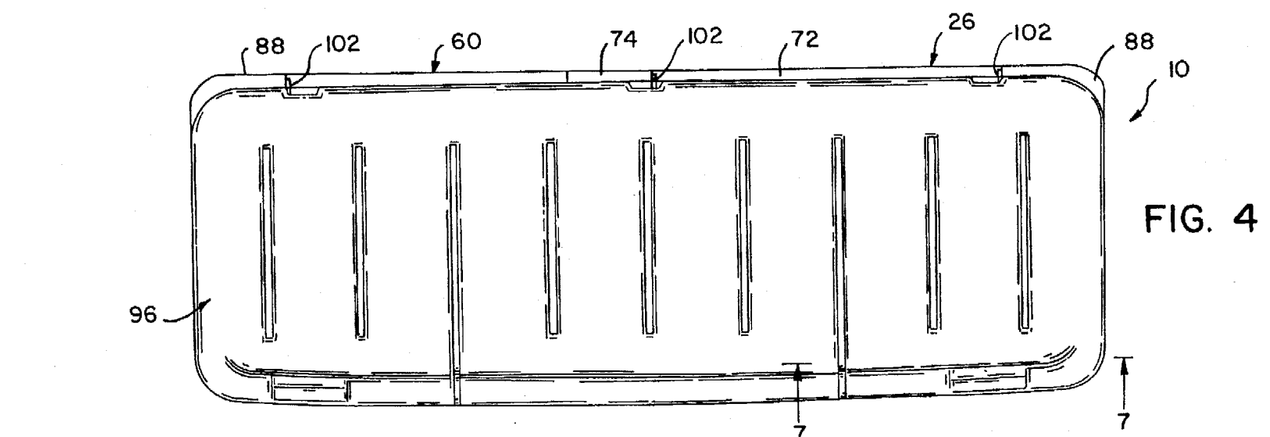
FIG. 4 is a top view of the utility box shown in FIG. 1.
Figure 5:
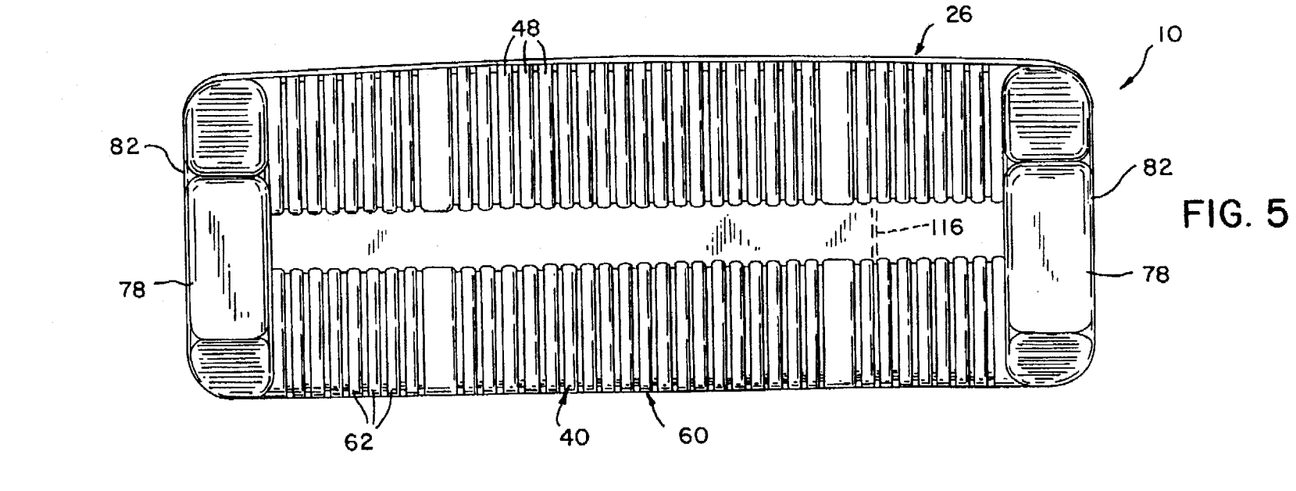
FIG. 5 is a bottom view of the utility box shown in FIG. 1.
Figure 6:
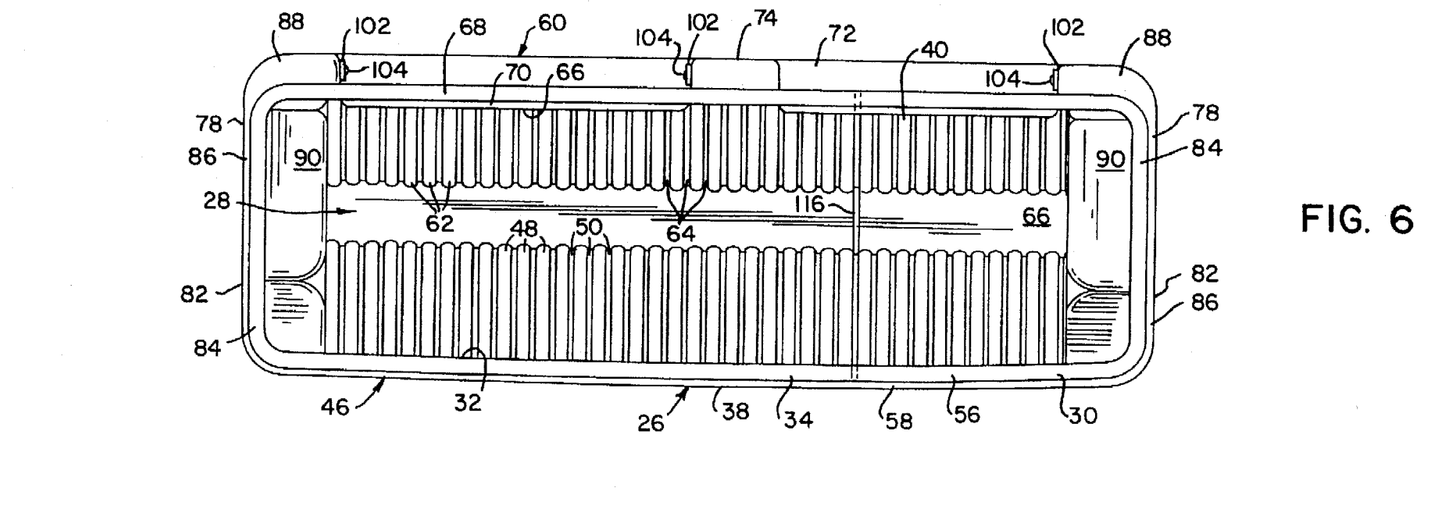
FIG. 6 is a partially cross-sectional top view of the utility box similar to FIG. 4 but without the lid and fluid springs for supporting the lid.

As shown in FIGS. 1–6, the utility box 10 includes a container portion or bin 26 that defines (FIG. 6) a storage compartment 28 for stowing tools or other equipment. The bin 26 is preferably blow-molded from a sheet of thermoplastic material, such as high density polyethylene, and has a unitary construction. As shown in FIG. 6, the bin 26 includes an upper rim 30 that defines an opening 32 through which access to the storage compartment 28 is obtained. The upper rim 30 includes an annular seal surface 34 which in the illustrated arrangement is molded integrally with the rest of the bin 26. If desired, the seal surface 34 could be provided by an add-on metal bracket (not shown). The seal surface 34 is provided with a sealing gasket 36 along its periphery, and the gasket 36 is preferably a hollow bulb type gasket. The upper rim 30 also includes a stepped section 38 extending downwardly from the seal surface 34.

The bin 26 also includes a bottom wall 40 that is generally arch-shaped for reasons more fully explained below. In particular, the bottom wall 40 includes (FIGS. 1 and 3) a raised portion or apex 42 and opposite side portions 44 that slant downwardly from the apex 42.

The bin 26 also includes a front wall 46 that is corrugated to provide a plurality of ribs 48. As shown in FIGS. 6 and 7, the ribs 48 extend onto the front portion of the bottom wall 40. For aesthetic reasons, the rib pattern preferably matches (FIG. 7) the rib pattern of the bed liner 24, and the ribs 48 define therebetween (see FIG. 8) a plurality of vertical slots 50 on the interior of the front wall 46 that become horizontal on the bottom wall 40. As shown best in FIG. 8, each of the ribs 48 includes an upper surface or edge 52 that forms the front part of a generally horizontal support rim 54. The support rim 54 is spaced below the upper rim 30 for reasons explained below. The front wall 46 also includes a seal surface portion 56 and a stepped portion 58 that form front parts of the seal surface 34 and the stepped section 38 of the upper rim 30, respectively.

The bin 26 also includes a back wall 60 that is corrugated to match the front wall 46 and that forms a plurality of ribs 62. Referring again to FIGS. 6 and 7, ribs 62 define therebetween a plurality of vertical slots 64 on the interior of the back wall 60. Like slots 50 on the front wall 46, slots 64 extend onto the bottom wall 40. Also, as best shown in FIG. 6, the ribs 48 and 62 do not meet on the bottom wall 40 so that the bottom wall 40 is provided with a ribless portion 66. The back wall 60 also includes (FIG. 8) a seal surface portion 68 that forms a back part of the seal surface 34 of the upper rim 30 and a ledge 66 spaced above the ribs 62. The ledge 66 includes a support surface 70 that is generally coplanar with the upper edges 52 of the ribs 48 on the front wall 46 and that combines with those upper edges 52 to complete the support rim 54. As shown in FIG. 8, the back wall 60 further includes a slanted surface portion 72 extending generally outwardly and downwardly from the inner edge of the ledge 66, and a lid-mounting ear or projection 74 extending upwardly from the slanted surface portion 72. In the illustrated arrangement the projection 74 is hollow (see FIG. 3) and includes opposite walls 76.

To support the utility box 10 on the floor 14 of the cargo bed 12, the bin 26 is also provided with a pair of laterally spaced apart legs 78. The legs 78 extend downwardly from the bottom wall 40 so that when the utility box 10 is placed on the cargo bed floor 14 the bottom wall 40 is (see FIGS. 1 and 7) positioned above the floor 14 to define therebetween a space indicated by reference numeral 80. The legs 78 are preferably spaced apart somewhat greater than about four feet so standard four feet wide sheet material can be slid into the space 80 beneath the bin 26. As shown in FIG. 7, each of the legs 78 includes an outer or side wall 82 of the bin 26 that includes a seal surface portion 84 and a stepped portion 86 that form side parts of the seal surface 34 and the stepped section 38 of the upper rim 30, respectively. The legs 78 also include rear portions (see FIG. 3) that form lid-mounting projections 88.

In addition to providing support for the utility box 10, the legs 78 also serve a drainage function. In particular, as shown in FIG. 7 each of the legs 78 is hollow and defines a drainage compartment 90 in the lower part thereof. The drainage compartments 90 are positioned at the ends of the side portions 44 of the bottom wall 40 so that fluids that may accumulate in the storage compartment 28, such as from condensation or leaving the utility box 10 open in the rain, will drain into the drainage compartments 90. To accommodate this drainage, the ribless portion 66 on the bottom wall 40 provides a drain path between the ribs 48 and 62. To drain the storage compartments 90 when desired, each of the legs 78 is also provided with a drain hole 92 and a plug member 94 for closing the drain hole 92.

The utility box 10 also includes a lid 96 which in one embodiment is blow-molded from thermoplastic material. As shown in FIG. 8, the lid 96 is pivotally mounted on the bin 26 for movement between a closed position (shown in solid lines) and an opened position (shown in broken lines), and a latch mechanism 98 is provided for locking and unlocking the lid 96. To mount the lid 96 on the bin 26 the lid 96 is provided with (FIG. 3) hinge pins 100 and hinge plates 102 that receive the hinge pins 100 and that are mounted on the projections 74 and 88 on the bin 26. In the particular arrangement illustrated in the drawings each hinge plate 102 is secured to one of the projections 74 and 88 using fasteners 104. Each of the fasteners 104 preferably includes a shoulder screw that extends through a single material thickness (i.e., one of the walls 76 or a wall of one of projections 88) and an expansion nut to prevent leakage into the bin 26. The nut is preferably positioned in the interior of the bin 26 (i.e., in the storage compartment) to prevent tampering.

To prevent leakage between the lid 96 and the bin 26, the lid 96 also includes (FIGS. 7 and 8) a seal surface 106 which engages the gasket 36 and overlies the seal surface 34 of the upper rim 30 on the bin 26 when the lid 96 is closed. The lid 96 also includes a peripheral lip 108 that extends outwardly from the seal surface 106 and that overlies the stepped portion 38 of the upper rim 30 when the lid 96 is closed to deflect water away from ingress between the lid 96 and the bin 26.

Referring to FIGS. 7 and 8, the utility box 10 also includes a pair of fluid or gas springs 110 (only one is shown) for holding the lid 96 in the opened position. While the arrangement for mounting each of the springs 110 can vary, in the embodiment illustrated in FIGS. 1–8 each of the mounting arrangements includes a bracket 112 secured to the lid 96 and a bracket 114 secured to the bin 26. The spring 110 is mounted between the brackets 112 and 114.

The utility box 10 is also provided with storage accessories for compartmentalizing the storage compartment 28. Those accessories include dividers 116 (only one of which is shown in FIGS. 6–8). In the illustrated arrangement each divider 116 is insertable into a corresponding pair of the slots 50 and 64 to divide the storage compartment 28 laterally. Each divider 116 can be quickly vertically withdrawn from one set of slots 50 and 64 and repositioned in another set to change the configuration of the storage compartment 28.

Figure 9:
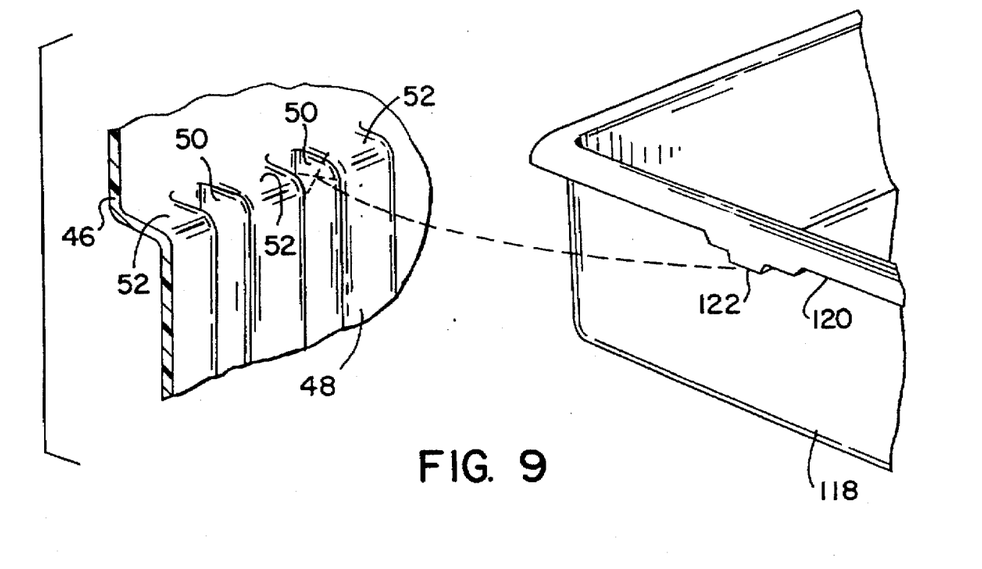
FIG. 9 is an enlarged and exploded perspective view illustrating engagement of one of the trays with ribs on the utility box to restrict movement of the tray.

The utility box 10 also includes one or more trays 118. As shown in FIGS. 7 and 8, each tray 118 includes a peripheral rim or lip 120 for supporting the tray 118 on the support rim 54. Each tray 118 is also provided with means for preventing sliding movement relative to the support rim 54. In the illustrated arrangement such means includes (see FIGS. 7–9) a detent or tongue member 122 extending downwardly from the lip 120. The tongue member 122 is insertable into one of the slots 50 when the tray 118 is supported on the support rim 54 to prevent the tray 118 from sliding.

Each tray 118 is also insertable beneath the bin 26 into the space 80, and means are provided for supporting the tray 118 in that position and against sliding movement. In the illustrated arrangement (see FIGS. 7 and 8) such means includes portions of the outermost ribs 48 and 62 which project downwardly to form detents 124. To secure a tray 118 in the space 80 the tray 118 is positioned so that the detents 124 are received within the tray 118, thereby confining a portion of the tray 118 between the detents 124 and one of the legs 78.

Figure 10:
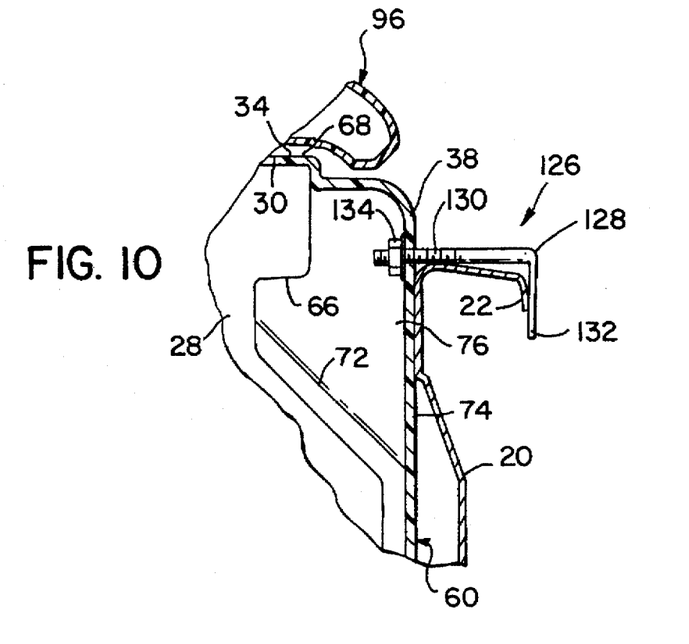
FIG. 10 is an enlarged cross-sectional view showing attachment of the utility box to the front of the cargo bed.

To secure the utility box 10 within the cargo bed 12 means for preventing lateral movement of the bin 26 are provided. In the illustrated arrangement such means includes (FIG. 10) a clamp assembly 126. As shown in FIG. 10, the clamp assembly 126 includes a clamp member which in the illustrated arrangement is a J-shaped hook 128. The hook 128 includes a threaded first portion 130 that extends through the projection 74 and into the storage compartment 28 and a second or hook portion 132 that extends over the rail portion 22 of the front wall 20 of the cargo bed 12 to capture the rail portion 22. The clamp assembly 126 also includes means for adjusting the tension in the hook 128 to draw the utility box 10 tighter to the front wall 20 of the cargo bed 12 or to loosen that connection. In the illustrated arrangement such means is accessible only from the interior of the bin 26 to resist tampering and includes a nut 134 threaded onto the first portion 130 of the hook 128.

While only a single clamp assembly 126 is illustrated, additional clamp assemblies 126 are also provided on the projections 88 formed by the legs 78. Also, in a preferred embodiment the aforementioned means for preventing lateral movement of the bin 26 will be reinforced by a pair of non-invasive fastening devices (not shown) used in association with the side walls 82 of the bin 26. Those devices are preferably of the type shown in U.S. Pat. No. 4,850,633 which is herein incorporated by reference.

Figure 11:
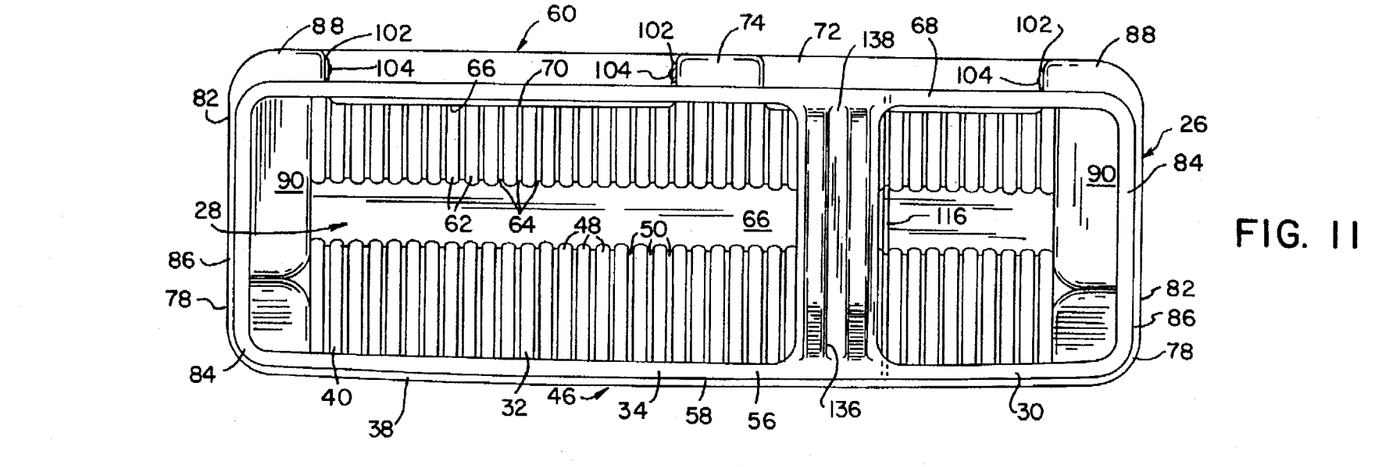
FIGS. 11–13 are views similar to FIGS. 6–8 but showing a utility box in accordance with a second embodiment of the invention.
Figure 12:
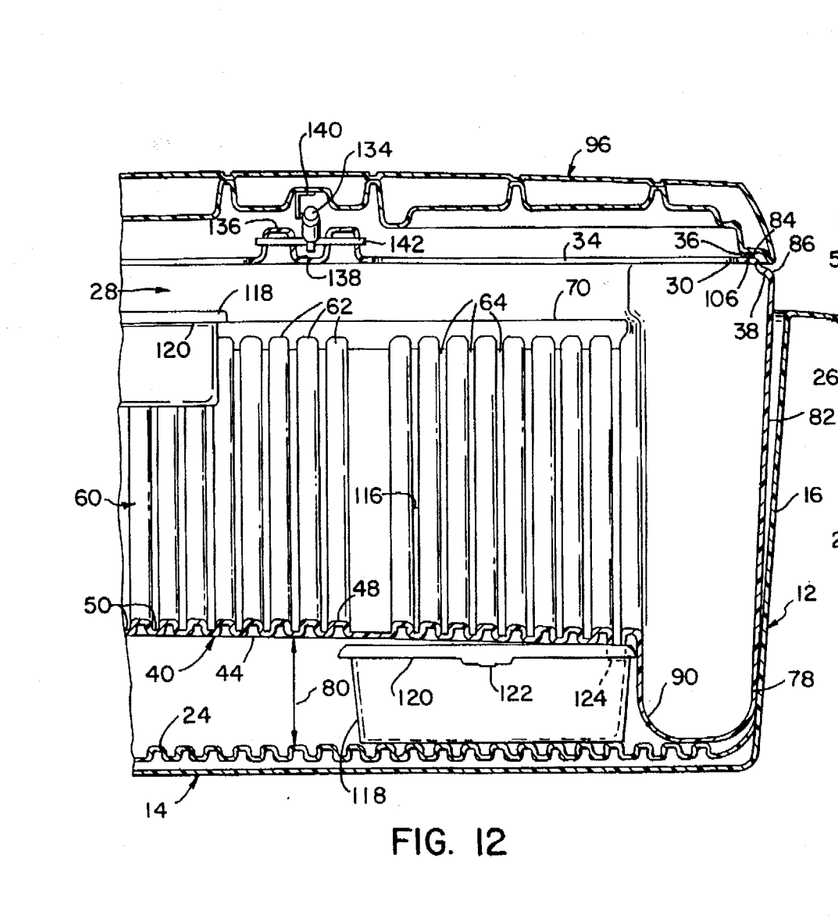
Figure 13:
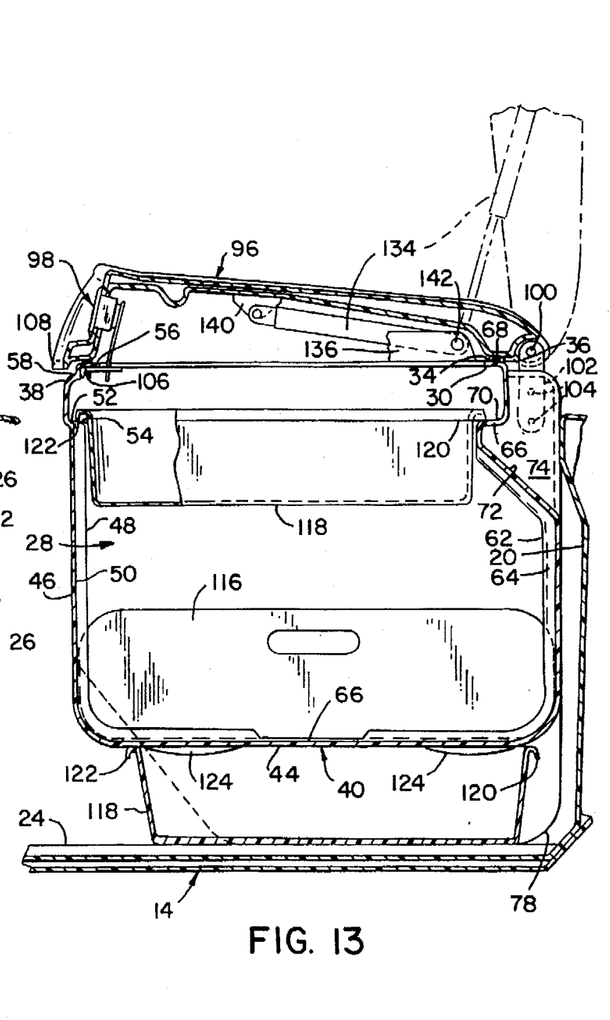

Illustrated in FIGS. 11–13 are portions of a utility box in accordance with a second embodiment of the invention. In this second embodiment, the springs 110 are replaced by a single spring 134 positioned inboard of the side walls 82 of the bin 26. To support the spring 134, the bin 26 is provided with a support strut 136 that extends between the front and back walls 46 and 60. The strut 136 is ribbed to define an upwardly opening inset area or channel 138, and the spring 134 is positioned in the channel 138 and is supported on one end by a bracket 140 on the lid 96 and on the other end by a pin 142 mounted on the strut 136. As shown in FIG. 12, when the lid 96 is closed the spring 134 is housed substantially in the channel 138 and is protected by the strut 136.

Various features of the invention are set forth in the following claims.

We claim:

1. A storage container for use in the cargo bed of a pickup track, the storage container comprising:

a bin defining a storage compartment, the bin including an annular upper rim defining an opening into the storage compartment, the bin including a bottom wall and a front wall, the front wall including a plurality of fibs defining vertical slots, each of the ribs on the front wall including an upper surface, and the bin having a back wall, the back wall including a plurality of ribs defining vertical slots, and a ledge spaced above the ribs on the back wall, the ledge including a support surface, the support surface and the upper surfaces of the ribs on the front wall combining to form a generally horizontal support rim spaced below the upper rim, and a tray supportable on the support rim in spaced relation above the bottom wall, the tray including a lip for engaging the upper surfaces of the ribs on the front wall and the ledge on the back wall.

2. A storage container set forth in claim 1 wherein the storage container includes a divider slidable vertically into and out of the slots in the front wall and the back wall to compartmentalize the storage compartment.

3. A storage container set forth in claim 1 wherein the tray includes means for preventing sliding movement of the tray relative to the support rim, the means for preventing sliding movement of the tray including a detent receivable in one of the slots in the front wall and the back wall.

4. A storage container as set forth in claim 1 wherein the tray includes a tongue member, the tongue member being receivable in one of the slots in the front wall and the back wall to restrict sliding movement of the tray relative to the support rim.

5. A storage container as set forth in claim 1 wherein the bin includes a pair of legs extending downwardly from the bottom wall, the legs supporting the bottom wall above the floor of a cargo bed of a pick-up truck when the storage container is placed thereon so that the bottom wall and the floor of the cargo bed define therebetween a space, and wherein the tray is insertable into said space and includes means for supporting the tray against movement relative to the bin when placed in said space.

6. A storage container as set forth in claim 1 wherein the bin includes a pair of legs extending downwardly from the bottom wall so that when the storage container is placed in the cargo bed of a pick-up truck the bottom wall is spaced above the floor of the cargo bed, wherein the tray is insertable into the space between the bottom wall and the floor of a cargo bed, and wherein the storage container includes means for supporting the tray against movement relative to the bin when placed thereunder, the means for supporting the tray against movement including a detent extending downwardly from the bottom wall, the detent being engageable with the tray to restrict its movement.

7. A storage container as set forth in claim 1 wherein the bin includes a pair of spaced apart legs extending downwardly from the bottom wall so that each of the legs defining a drainage compartment, wherein the bottom wall includes a raised portion and opposite portions slanting downwardly from the raised portion to the legs so that fluid accumulated on the bottom wall drains into the drainage compartments.

8. A storage container as set forth in claim 1 wherein the bin includes opposite side walls, and a strut member positioned inboard of the opposite side walls, the strut member extending between the front wall and the back wall, and the strut member defining an upwardly opening channel, and wherein the storage container includes a lid pivotally mounted on the bin for movement between opened and closed positions, and a fluid spring connected between the bin and the lid, the fluid spring being housed at least partially in the channel defined by the strut member.

* * * * *